United States Patent [19]
Whiteman

[11] Patent Number: 5,636,829
[45] Date of Patent: Jun. 10, 1997

[54] EXTENDIBLE CHEATER BAR

[76] Inventor: Rob Whiteman, 3720 E. 57th St., Spokane, Wash. 99223

[21] Appl. No.: 551,828

[22] Filed: Nov. 7, 1995

[51] Int. Cl.$^6$ ............................................ B66F 3/00
[52] U.S. Cl. ............................................ 254/131
[58] Field of Search ............................ 154/DIG. 3, 120, 154/123, 129, 131; 285/12, 31, 35, 298, 333; 81/177.2

[56] References Cited

U.S. PATENT DOCUMENTS

| | | |
|---|---|---|
| 1,317,145 | 9/1919 | Skantz . |
| 2,520,652 | 8/1950 | Pfauser et al. . |
| 2,575,685 | 11/1951 | Shugart et al. ............... 285/298 |
| 3,119,278 | 1/1964 | Simpson . |
| 3,843,981 | 10/1974 | Verest . |

Primary Examiner—D. S. Meislin
Assistant Examiner—Thomas W. Lynch
Attorney, Agent, or Firm—Wells, St. Johns, Roberts Gragory & Matkin, P.S.

[57] ABSTRACT

Disclosed is an extendible cheater bar for use in tightening the ratchet mechanisms and consequently the straps used in long haul trucking applications for the securement of loads. The extendible cheater bar includes a second body member and a first body member. The second body member is hollow, elongated and includes an internal cavity with an internal surface which is partially or wholly internally threaded. The first body member is elongated and has an outer surface which is partially or wholly externally threaded. The first body member screws into and out of the internal cavity of the second body member, thereby forming an extendible and retractable cheater bar lever with improved characteristics while maintaining the necessary rigidity.

4 Claims, 7 Drawing Sheets

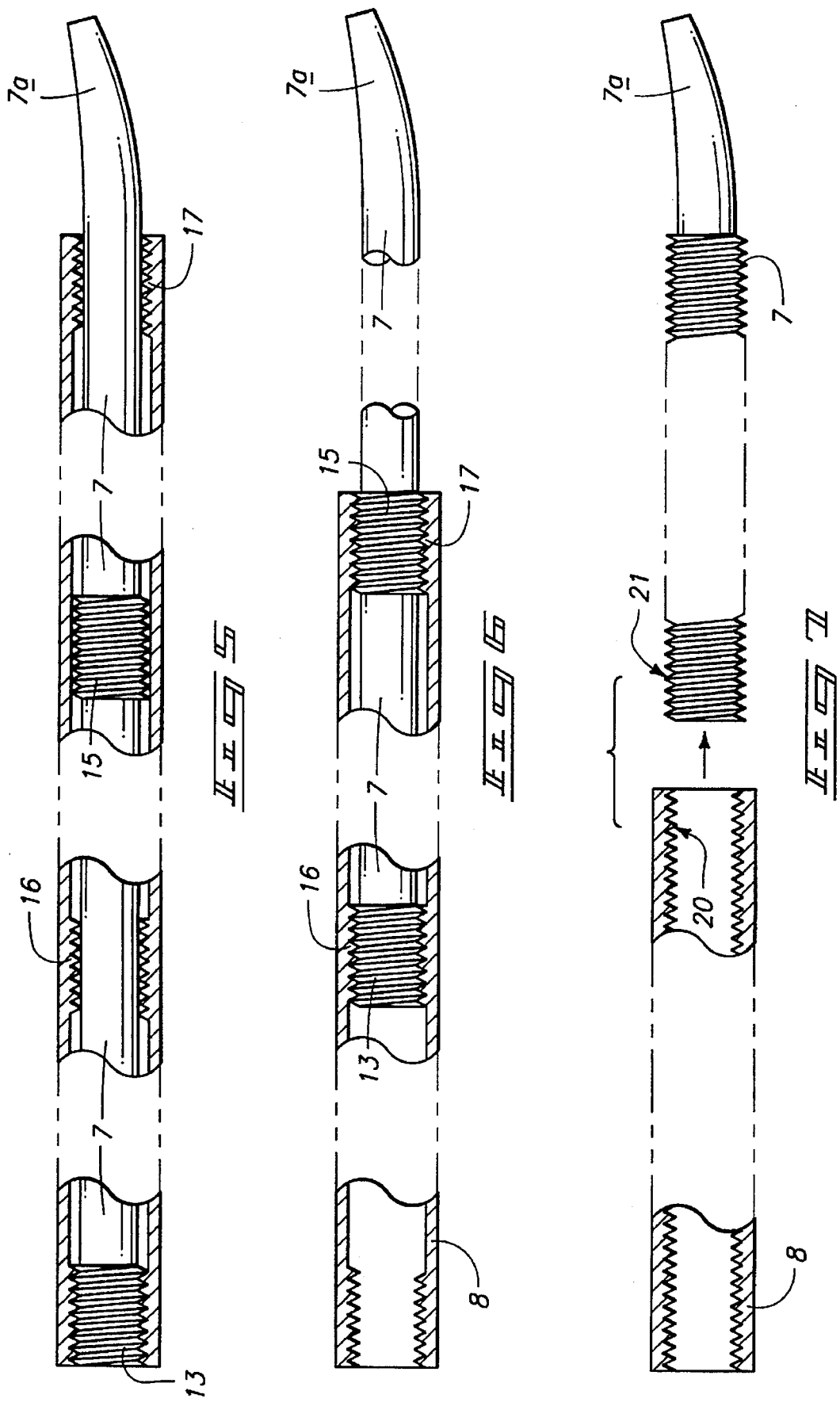

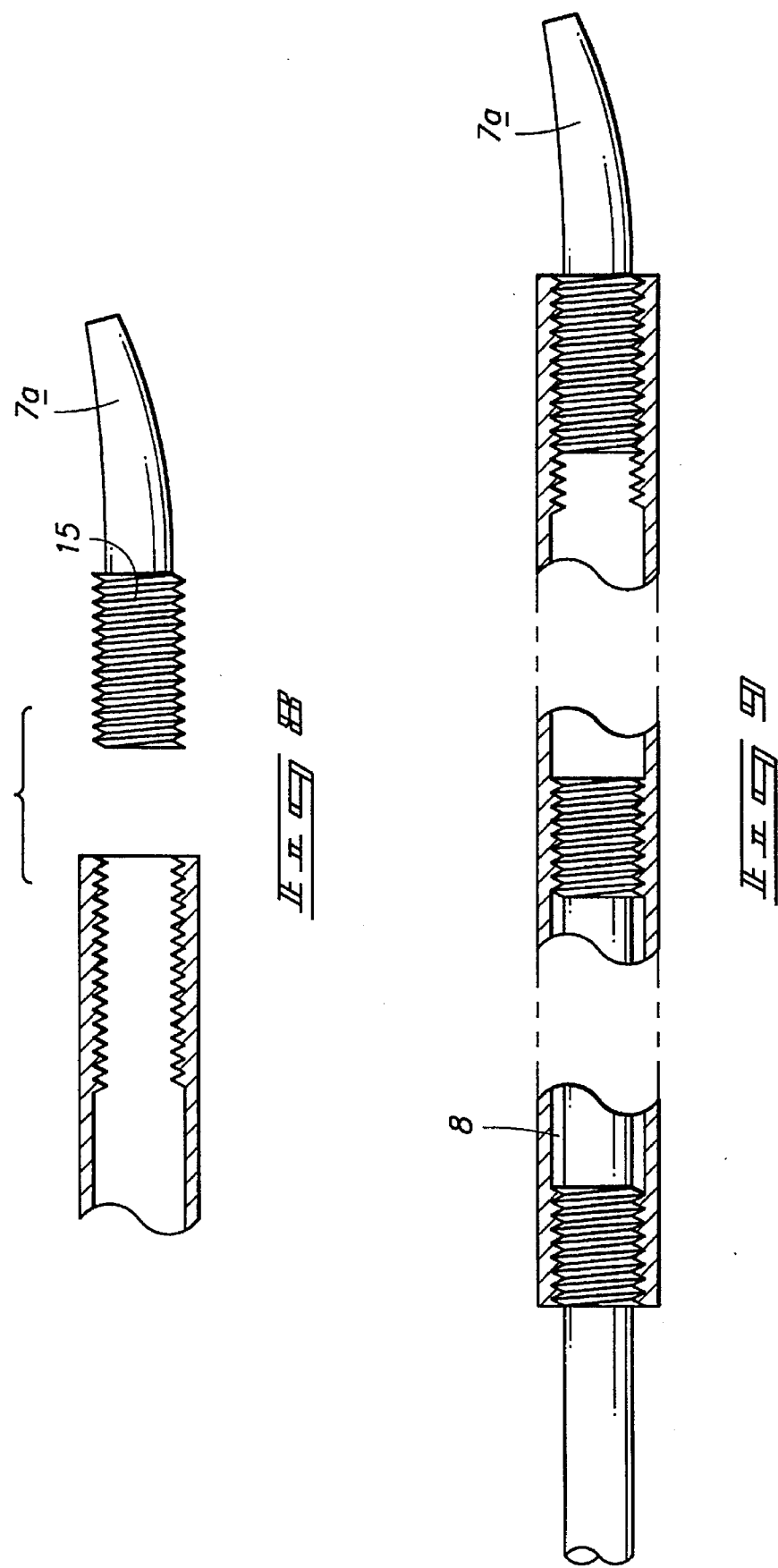

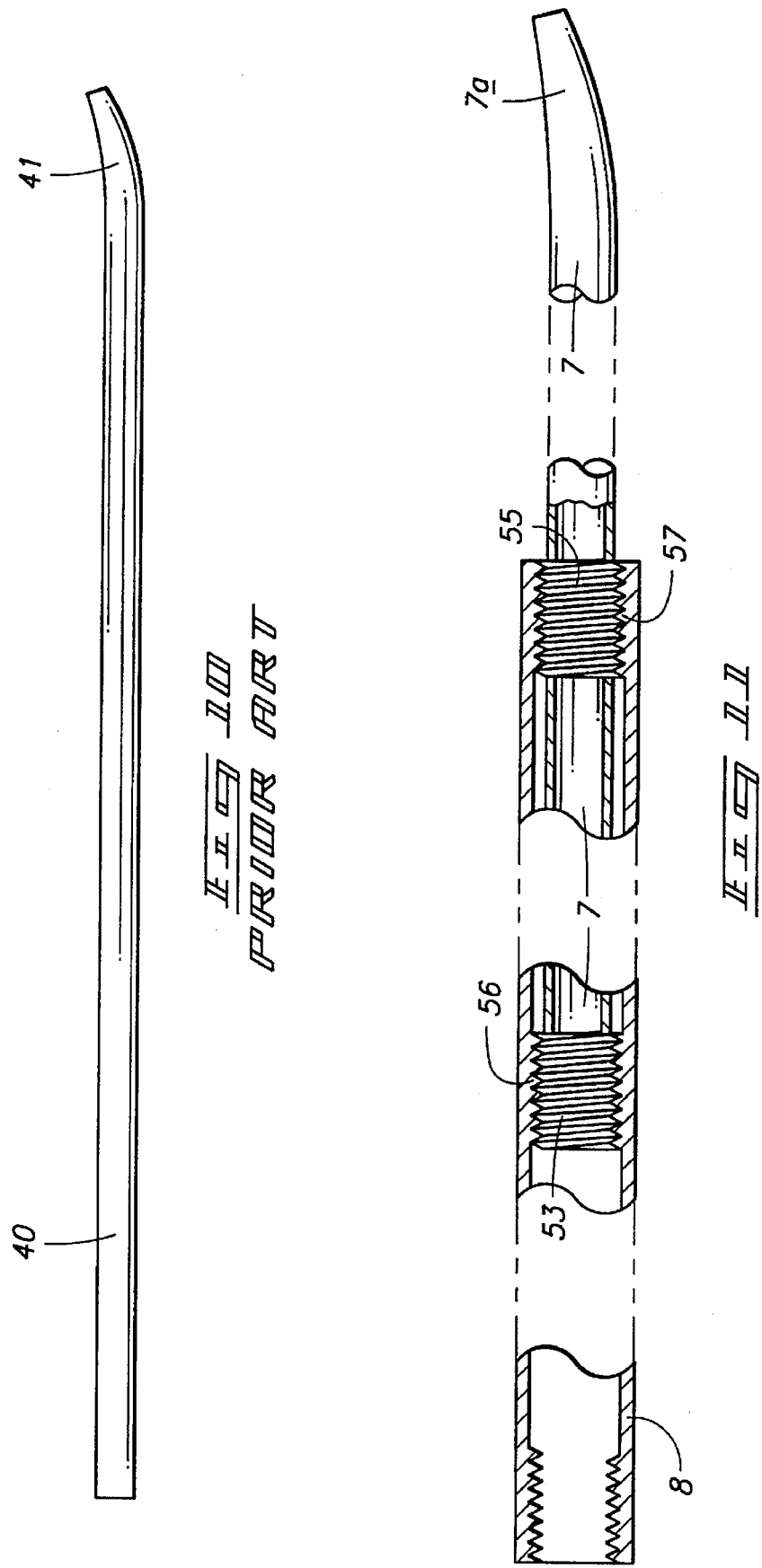

EXTENDIBLE CHEATER BAR

TECHNICAL FIELD

This invention generally pertains to an extendible cheater bar for use in tightening the ratchet mechanisms and consequently the straps used to secure loads in long haul trucking applications.

BACKGROUND OF THE INVENTION

The commerce of the United States cannot exist today at any reasonable level without the long haul trucking industry, which is the cornerstone of American industry. Countless different products are loaded on trailers of different types and transported all over the country.

Truckers generally use straps, ropes and chains to secure a load to the beds of truck trailers depending ont he particular load. The straps, ropes and chains are generally used to secure the load to the bed of the trailer by placing them over the load and then securing them on each side to the trailer. The straps, ropes and chains are generally secured to the trailer through a winch or rachet mechanism, which must generally be turned or cranked to tighten the strap and secure the load.

In order to sufficiently tighten the winch or rachet mechanism, most, if not all truckers, carry what is generally referred to in the industry as a cheater bar. A cheater bar is very generally a finger lever attached to a bar or rod handle. The finger member is used to engage a winch or rachet mechanism and the lever arm attached to the finger is used as the lever. The trucker grabs the lever and imparts a force thereon to rotate the rachet and consequently to tighten the straps for instance. An example of a non-adjustable cheater bar is shown in FIG. 10, showing the handle portion 40 and the finger segment 41.

FIG. 1 illustrates a trucker 1 next to a truck trailer 2 carrying a load 3. In this example, a retaining strap 4 has been placed over the load 3 and through the ratchet mechanism 5.

In order to sufficiently tighten the strap 4 and secure the load 3, a cheater bar 6 is used. The cheater bar 6 in FIG. 1 includes a cheater bar second body member 8 and a cheater bar finger segment 7. The ratchet mechanism 5 has a finger recipient 5a into which the finger 7 of the cheater bar can be inserted. Once the finger 7 of the cheater bar is inserted, the trucker 1 can impart a force on the handle of the cheater bar, typically downward, to tighten the strap 4.

As the ratchet mechanism 5 is rotated, thereby tightening the strap 4, it has a ratcheting and locking mechanism which prevents it from rotating the opposite direction and thereby loosening the strap. In order to engage the locking mechanism however, the ratchet mechanism 5 must generally be rotated a certain minimum rotation, resulting in significant pressure just before the rotational lock portion of the ratchet mechanism 5 engages to prevent rotation. The failure to rotate the ratchet mechanism 5 that certain minimum rotation to engage the lock portion of the ratchet mechanism 5 coupled with a release of pressure by the trucker 1, may result in a backlash in which the tension built up in the cheater bar 6 through the partial rotation is released, thereby catapulting the cheater bar 6 upward and sometimes resulting in injury to the trucker 1.

In a typical situation and depending on the size and height of the trucker, the cheater bar 6 must generally be placed in a position which is very difficult to reach and difficult to impart as much a force as necessary to sufficiently tighten the strap. Often times the necessary position of the cheater bar is above a level wherein the trucker is comfortable and safe in imparting a force on the cheater bar. This also results in numerous injuries to truckers each year.

FIG. 10 illustrates a prior art cheater bar with a finger segment 41 attached to a handle segment 40. The prior art cheater bar is not extendible and the finger segment is generally welded to the handle segment.

Also in the trucking industry, it is necessary to carry substantial tools and equipment for use on the truck, the trailer and to handle loads, with only limited space in which to store the tools and equipment. Therefore truckers are generally very conscious about the size and shape of items before choosing to bring them along on a trip. The utility of the item is generally weighed with the limited available space in which to carry the tools and equipment.

Due to the limited space requirement within which to store the cheater bars, they have heretofore generally been limited approximately three (3) feet in length, which allows them to fit in typical storage compartments on the truck. With the substantial force that must typically be placed on the cheater bars to sufficiently secure some loads and the awkward position the trucker must oftentimes place himself or herself in order to rotate the cheater bar, a three feet handle is an insufficient lever arm length for most truckers to safely and easily tighten the winches or rachet mechanisms. Furthermore, because placing sufficient force on the cheater bar is difficult even under the best of situations, accidents occur wherein the cheater bar recoils and strikes a blow to the trucker attempting to tighten the load.

There has been a long felt need for a sufficiently rugged cheater bar which can fit within the three feet space limitation, but which also allows the trucker to more easily impart a greater force to tighten the winch. There has not heretofore been a cheater bar which fulfills this longfelt need.

It is an object of this invention to provide a cheater bar which allows the trucker to impart an increased rotational force on the ratchet mechanism without placing the trucker in further danger of injury. It is a further object of this invention to reduce the number and severity of cheater bar related injuries in the trucking industry.

It is still further an object of this invention to provide an expandable and retractable cheater bar which retracts down to three feet or less and which expands to lengths greater than three feet and preferably to five feet or more, while maintaining its structural integrity and necessary ruggedness.

This invention achieves the sufficient ruggedness by providing mating threads, i.e. external threads on the external surface of the first body member and corresponding internal threads on the interior surface of the exterior second body member.

BRIEF DESCRIPTION OF THE DRAWINGS

Preferred embodiments of the invention are described below with reference to the accompanying drawings, which are briefly described below.

3

Figure 1:
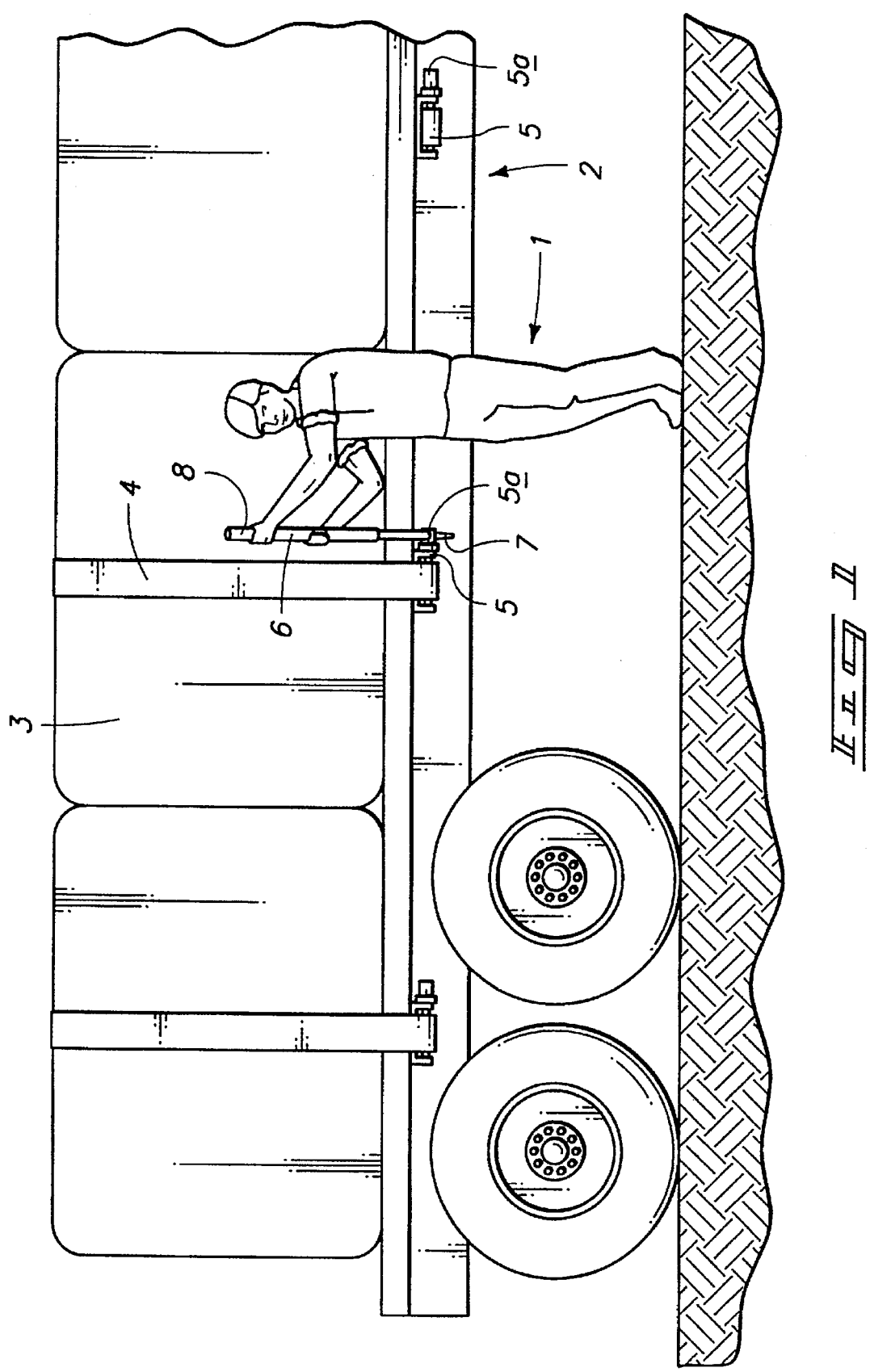
FIG. 1 is an elevation view of a trucker next to a typical loaded and strapped truck trailer.
Figure 2:
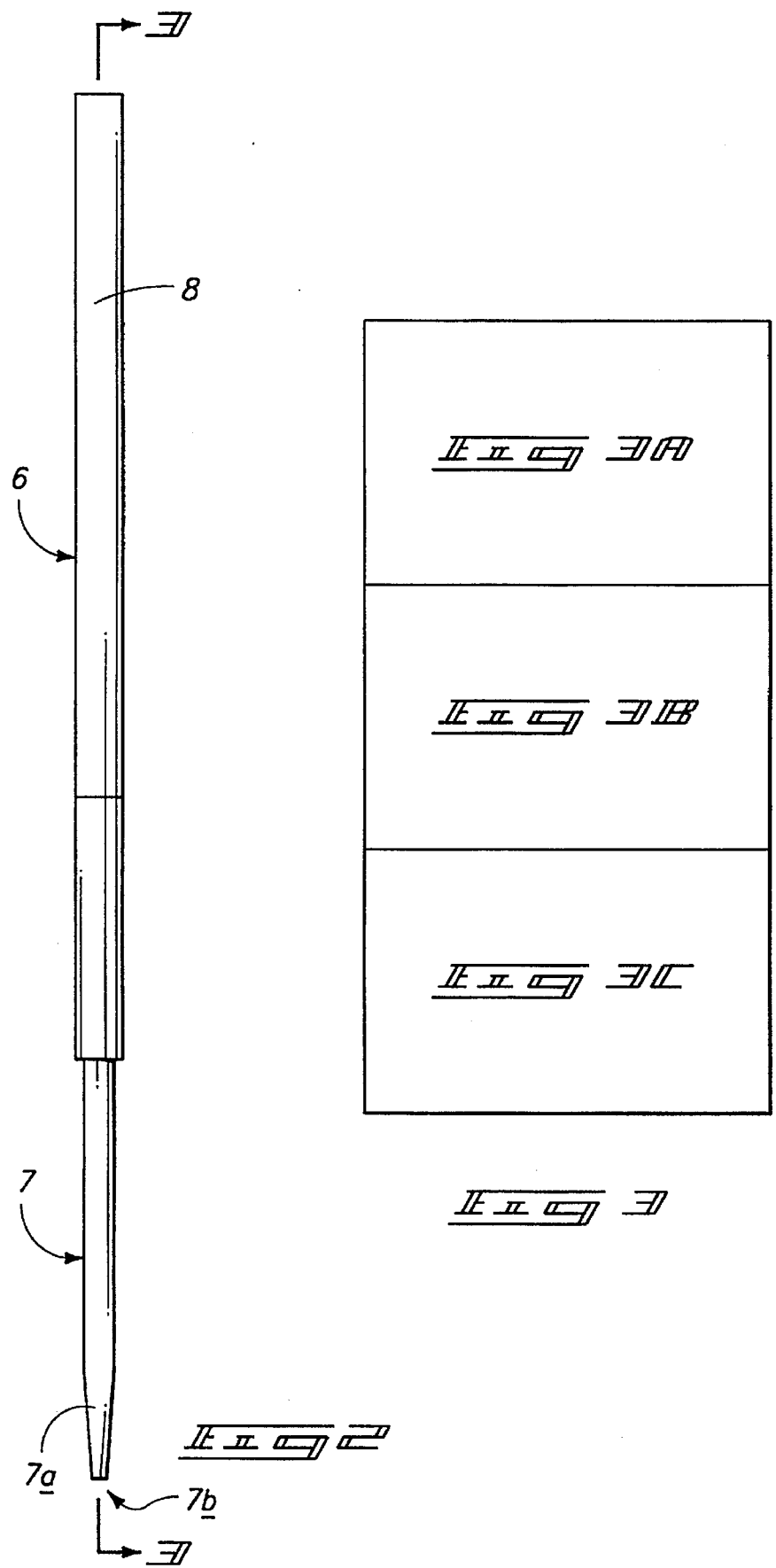
FIG. 2 is an elevation view of one application of the present cheater bar invention in an extended position.
Figure 4:
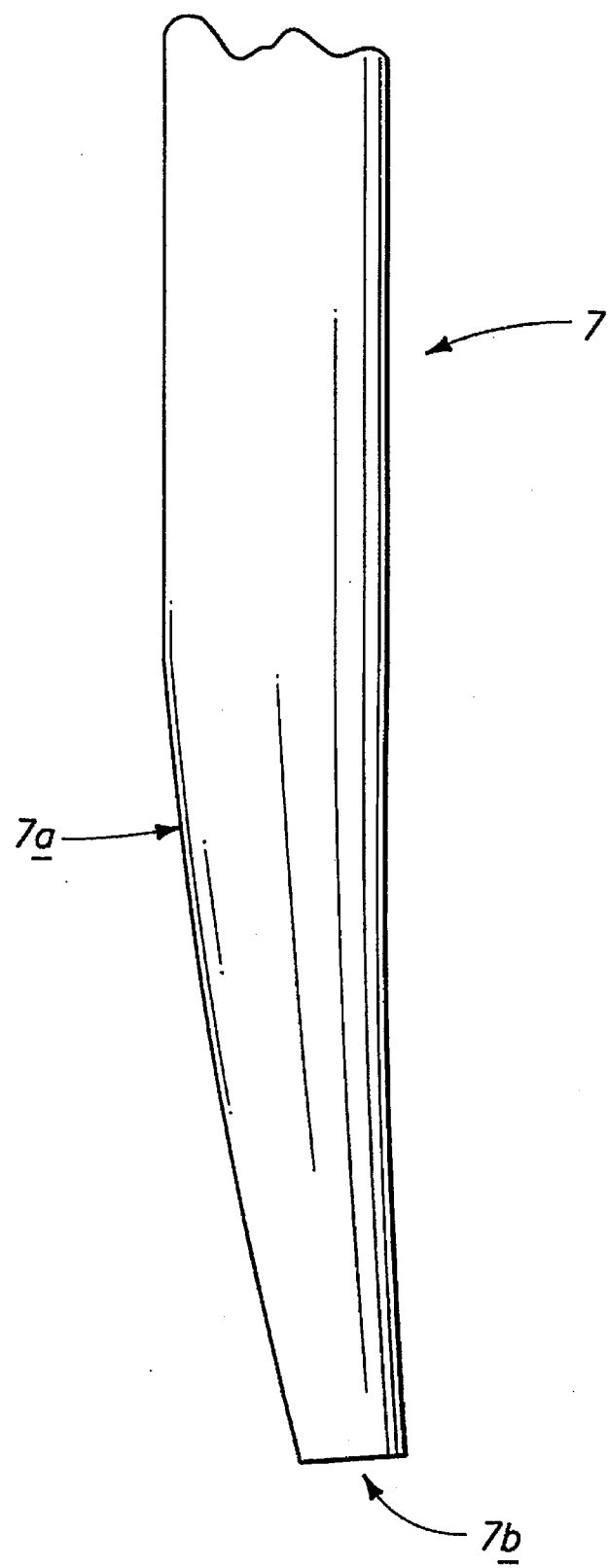

FIG. 3a is a breakaway section from FIG. 2, of the upper segment of the second body member of the cheater bar;

FIG. 3b is a breakaway section from FIG. 2, of the middle segment of the cheater bar;

FIG. 3c is a breakaway section from FIG. 2, of the lower segment of the cheater bar;

FIG. 4 is an elevation view of one application of the terminal end of the first body member or the finger segment;

FIG. 5 is an elevation view of one application of the cheater bar in an retracted position;

FIG. 6 is an. elevation view of one application of the cheater bar in an extended position and with a constant dimensioned terminal end of the first body member;

FIG. 7 is an elevation view of a cheater bar which illustrates the external surface of the first body member being wholly threaded and the internal surface of the second body member being wholly threaded;

FIG. 8 illustrates an alternative embodiment of the invention wherein an end of the second body member is attached to a finger member;

FIG. 9 illustrates an alternative embodiment of the invention wherein a finger member includes an externally threaded surface which attaches to the cheater bar by screwing therein;

FIG. 10 is an elevation view of a prior art cheater bar; and

FIG. 11 is an elevation view of one application of the cheater bar in an extended position and with the first body member being tubular.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Many of the fastening, connection, process and other means and components utilized in this invention are widely known and used in the field of the invention described, their exact nature or type is not necessary for an understanding and use of the invention by a person skilled in the art or science, and they will not therefor be discussed in significant detail. Furthermore, the various components shown or described herein for any specific application of this invention can be varied or altered as anticipated by this invention and the practice of a specific application of any element may already be widely known or used in the art or by persons skilled in the art or science and each will not therefor be discussed in significant detail.

FIG. 2 shows an elevation view of one application of an embodiment of a cheater bar 6 as disclosed by this invention, which is generally used as a lever arm with a finger. The first body member 7 of the cheater bar 6 is shown extending from within the cheater bar second body member 8. The first body member 7 shown is elongated, has a tapered segment 7a and terminates at a first end 7b.

The second body member 8 shown is elongated and hollow, and includes an internal cavity 11 as further shown in FIG. 3B. The terminal end 7b of the first body member 7 is shown, with the remaining end of the first body member being screwed into the second body member 8.

A finger segment 7a of the first body member 7, as used in this invention is the portion of the cheater bar which generally engages and interacts with the ratchet mechanism. Although the preferred embodiment is shown to be a tapered configuration, the finger segment 7a can be any one of a number of different shapes for adaptation to the specific ratchet or other mechanism on which it will be used, including a cylindrical bar. The finger segment 7a may also comprise a pawl-like member.

Although the finger segment 7a of the cheater bar 6 can be made out of numerous materials within the contemplation of this invention, a suitable hardened steel is preferred for its relative cost, strength and life.

The second body member 8 may also be constructed out of numerous different materials within the contemplation of this invention, with metal steel tubing being preferred for its relative strength and cost.

Figure 3:
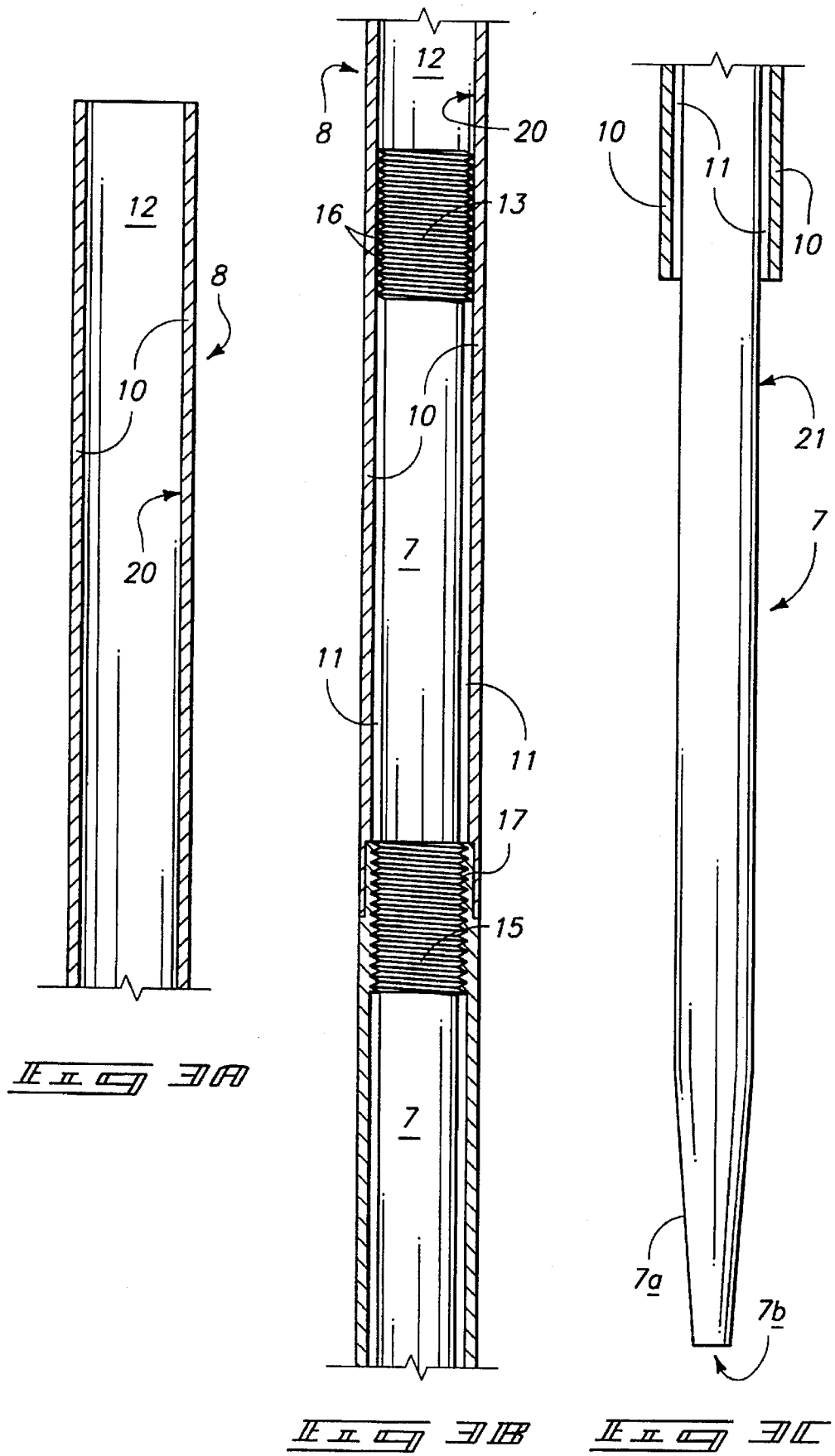
FIG. 3 is an illustration of three different cross section views of one application of the cheater bar as further illustrated in FIGS. 3A, 3B & 3C.

FIG. 3 illustrates the sections from which FIGS. 3A, 3B & 3C were taken from FIG. 2.

FIG. 3A is a cross section of the upper second body member 8 of the cheater bar when the cheater bar is in its fully extended position, illustrating the side walls 10, the internal surface 20 and the internal cavity 11 of the upper segment of the second body member 8.

FIG. 3B is a cross section of the middle segment of the cheater bar. FIG. 3B illustrates the internal cavity 11, the side walls 10 and the internal cavity 11 of the second body member 8. The second body member 8 in FIG. 3B includes an internal cavity 11 with internal threads 16 and 17.

While typical threads are shown in the drawings provided herein for illustrative purposes, this invention contemplates that other types of threads can be used of all classes and types. A few examples of threads which can be used are Acme and Stub Acme threads, buttress threads, unified threads and others.

FIG. 3B also illustrates the first body member 7 with an external surface with external threads 13 and 15. The external threads 13 and 15 are shown screwed into the internal threads 16 and 17 in the second body member 8.

FIG. 3C is a breakaway view inside the second body member 8 and illustrating the terminal end 7b of the first body member, the side walls 10 of the second body member 8 and the external surface 21 of the first body member.

FIG. 4 shows one application of the first end of the first body member 7 of the cheater bar. FIG. 4 illustrates a finger segment 7a which includes a tapered area and a terminal end 7b. The finger segment 7a of the cheater bar can be unitary or one piece with the first body member 7, or it can be a separate member which can be securely attached to an end of the first body member 7, which may make it more replaceable. If a separate piece, the finger segment 7a will be referred to as a finger member.

While most existing cheater bars have some type of taper section, and while it is preferable to have such a tapered section in this invention, it is not required to practice this invention. Instead, the end which engages the ratchet mechanism may be of constant cross section or dimensioned, tapered dimensions, or even increased dimensions with special coatings.

The typical prior art cheater bar is generally about three feet in length and therefore stores relatively easily in the truck. The specific configuration and lengths of the cheater bar provided by this invention can be changed and the resulting extended length of this cheater bar can be five feet or more.

It is also contemplated by this invention that a third body member can be added to increase the total length of the cheater bar. This can be accomplished by placing external threads on the external surface of the second body member and providing a third hollow body member with an internal surface with internal threads. The internal threads in the third body member would correspond to the external threads on the second body member in the same fashion as the second body member interacts with the first body member. Adding a third body member or more, could result in achieving extended cheater bar lengths of ten feet or more.

FIG. 5 is an elevation view of one application of the cheater bar in a retracted position, illustrating the external threads 13 and 15 on the first body member 7, the external threads 16 and 17 of the second body member 8 and the finger segment 7a of the first body member 7.

FIG. 6 is an elevation view of one application of the cheater bar in an extended position for use by a trucker, illustrating the external threads 13 and 15 on the first body member 7, the external threads 16 and 17 of the second body member 8 and the finger segment 7a of the first body member 7.

FIG. 6 further illustrates the invention with a constant dimensioned terminal end 7a of the first body member 7.

FIG. 7 is an elevation view of a cheater bar which illustrates an application of the invention wherein the external surface 21 of the first body member 7 is continuously externally threaded along its length and wherein the internal surface 20 of the internal cavity 11 of the second body member 8 is continuously internally threaded along its entire length.

FIG. 8 illustrates an alternative embodiment of the invention wherein an end of the second body member is attached to a finger member and wherein the first body member screws into the second body member in the same or equivalent manner in which the first body member screws into the second body member as illustrated in FIG. 2 and FIG. 3.

FIG. 8 also illustrates an application of the invention wherein the finger member includes an externally threaded segment which can be screwed into an internally threaded end in an internal cavity in the second body member.

FIG. 9 further illustrates an alternative embodiment of the invention wherein a finger member includes an externally threaded surface which attaches to the cheater bar by screwing therein. FIG. 9 illustrates that when a separate finger member is utilized in practicing the invention, it can not only be attached by welding or other attachment means, but can also be attached by including an externally threaded surface portion that screws into an internally threaded cavity. The internally threaded cavity can either be screwed into an internal cavity of the first body member in the embodiment in which the finger member is attached to the first body member, or, in the alternative embodiment wherein the finger member is attached to the second body member (as illustrated in FIG. 8).

FIG. 11 is an elevation view of one application of the cheater bar in an extended position and in which the first body member 7 is tubular and fits within the second body member 8, which is also tubular. In this embodiment, the finger segment 7a can either be attached to an end of the first body member 7, or it can be screwed therein. FIG. 9 illustrates how the finger segment 7a can be screwed into the second body member 8, and similar methods and ways can be used to screw the finger segment 7a into the first body member, as shown in FIG. 11.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. An extendible cheater bar for use by truck drivers, comprising:
    a. an elongated first body member with a terminal end that terminates in a finger and having an external surface with a first set of external threads and a second set of external threads spaced apart from the first set of external threads on the external surface; and
    b. an elongated and hollow second body member, comprised of
        i. an internal cavity having an internal surface with a first set of internal threads and a second set of internal threads spaced apart from the first set of internal threads on the internal surface,
            (1) the first set of internal threads corresponding to the first set of external threads on the elongated first body member and the second set of internal threads corresponding to the second set of external threads on the elongated first body member,
            (2) the internal cavity corresponding in size to the external surface of the first body member, such that a remaining end of the first body member can be inserted into the second body member by screwing the external threads of the first body member into the internal threads of the second body member.

2. An extendible cheater bar as recited in claim 1, and further comprising:
    a. a first body member wherein the terminal end of the first body member includes an internal cavity having an internal surface with internal threads on the internal surface; and
    b. a finger member which is comprised of
        i. a terminal end; and
        ii. an externally threaded segment;
    such that the externally threaded segment of the finger member can be inserted into the internal cavity of the terminal end of the first body member by screwing the external threads of the finger member into the internal threads of the internal cavity.

3. An extendible cheater bar lever for use by truck drivers, comprising:
    a. a finger segment with a terminal end;
    b. an elongated first body member,
        i. having a first end connected to a remaining end of the finger segment;
        ii. having an external surface with a first set of external threads and a second set of external threads spaced apart from the first set of external threads on the external surface; and
    c. an elongated and hollow second body member comprised of
        i. an internal cavity having an internal surface with a first set of internal threads and a second set of internal threads spaced apart from the first set of internal threads on the internal surface,
            (1) the first set of internal threads corresponding to the first set of external threads on the elongated first body member and the second set of internal threads corresponding to the second set of external threads on the elongated first body member, (2) the internal cavity corresponding in size to the external surface of the first body member, such that a remaining end of the first body member can be inserted into the second body member by screwing the external threads of the first body member into the internal threads of the second body member.

4. An extendible cheater bar lever for use by truck drivers as recited in claim 3, and in which the finger segment further comprises:

a. a terminal end; and
 b. external threads;

and in which the elongated first body member is hollow and comprised of an internal cavity having an internal surface with internal threads which correspond to the external threads on the finger segment, such that the finger segment can be inserted into the first body member by screwing the external threads of the finger segment into the internal threads of the first body member.

* * * * *